(12) United States Patent
Nayak et al.

(10) Patent No.: US 8,069,760 B2
(45) Date of Patent: Dec. 6, 2011

(54) METHOD AND APPARATUS TO REMOVE CAST FROM AN INDIVIDUAL

(76) Inventors: Suresh Nayak, Cincinatti, OH (US); Ronald R Watson, Placida, FL (US)

( * ) Notice: Subject to any disclaimer, the term of this patent is extended or adjusted under 35 U.S.C. 154(b) by 0 days.

(21) Appl. No.: 12/799,711

(22) Filed: Apr. 30, 2010

(65) Prior Publication Data

US 2010/0222726 A1    Sep. 2, 2010

Related U.S. Application Data

(63) Continuation-in-part of application No. 12/315,212, filed on Dec. 1, 2008.

(51) Int. Cl.
*A61F 5/05* (2006.01)

(52) U.S. Cl. .................. 83/13; 30/290; 30/294; 30/370; 606/105.5; 602/9

(58) Field of Classification Search .......... 83/13; 602/5, 602/9, 3, 30; 30/370–375, 90.1, 90.6, 90.4, 30/90.8, 289, 290, 294, 297, 314, 317; 606/138, 606/85, 167, 171, 172, 176–179, 82, 105.5; 407/29.1, 29.15; 451/79

See application file for complete search history.

(56) References Cited

U.S. PATENT DOCUMENTS

| | | | | |
|---|---|---|---|---|
| 1,719,557 A * | 7/1929 | McGrath | .................... | 606/105.5 |
| 2,187,175 A * | 1/1940 | Prosperi | ............................ | 602/9 |
| 2,206,339 A * | 7/1940 | Ulman, Jr. | ........................ | 602/9 |
| 2,490,878 A * | 12/1949 | Marsh | ............................. | 30/276 |
| 2,519,520 A * | 8/1950 | Waxlax | ............................. | 602/9 |
| 3,867,931 A * | 2/1975 | Babka | ............................. | 602/9 |
| 4,129,127 A * | 12/1978 | Ellison | ............................ | 602/12 |
| 5,944,675 A * | 8/1999 | Bequet-Sharber et al. | ........ | 602/9 |
| 2010/0024223 A1* | 2/2010 | Lehman et al. | ................. | 30/374 |

* cited by examiner

*Primary Examiner* — Phong H Nguyen
(74) *Attorney, Agent, or Firm* — Tod R. Nissle, P.C.

(57) ABSTRACT

A method for installing a fiberglass cast on and removing the cast from an individual includes an openended pliable thin-walled polymer guide track and cutting tool designed to track along said guide track to cut the cast and to prevent, while a cast is being removed, injury to the individual.

1 Claim, 10 Drawing Sheets

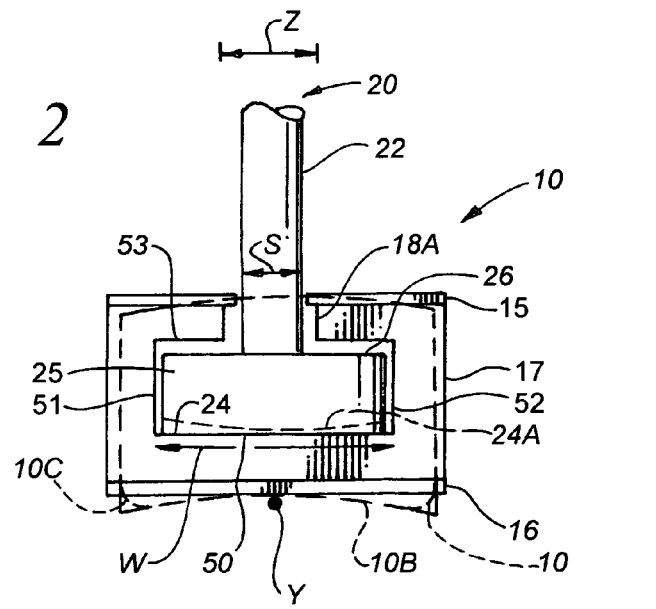
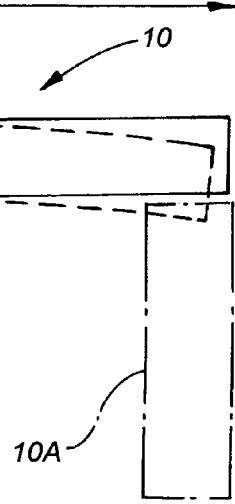
FIG. 2
FIG. 3

FIG. 9
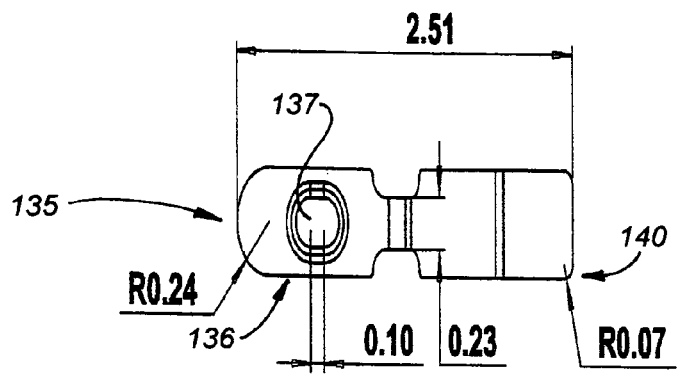
FIG. 11
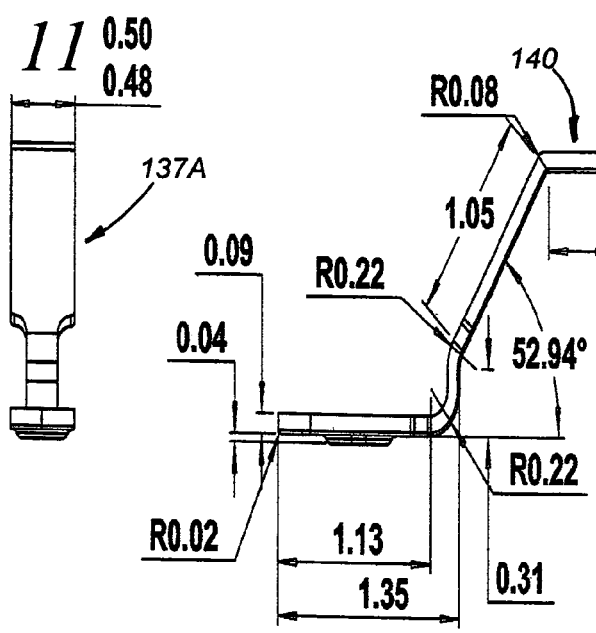
FIG. 12
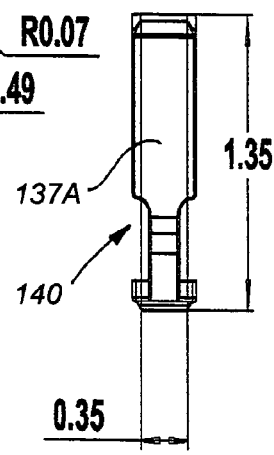
FIG. 10

METHOD AND APPARATUS TO REMOVE CAST FROM AN INDIVIDUAL

CROSS-REFERENCE TO RELATED APPLICATION

This application is a continuation-in-part of application Ser. No. 12/315,212, filed Dec. 1, 2008.

BACKGROUND OF THE INVENTION (1) Field of the Invention

This invention relates to casts that are temporarily placed on individual's skeletal or muscular structure. One common use of a cast is to support the leg, arm, or other part of the body.

More particularly, the invention pertains to a method and apparatus for removing such casts.

(2) Description of Related Art

First Trend

A first trend in connection with the removal of a cast comprises placing an elongate tubular guide or channel on a portion of the body of an individual prior to applying the cast and permitting the cast to solidify. The cast, when applied, covers the tubular guide. When the time comes to remove the cast an elongate cutting wire is fed through the tubular guide. The cutting wire is moved back and forth to outwardly cut through the cast, or is otherwise forced outwardly through the cast to cut the cast. One common cutting wire is identified by the name Giggli saw.

Second Trend

A second trend in connection with the removal of a cast comprises placing an elongate tubular guide or channel on a portion of the body of an individual prior to applying the cast and permitting the cast to solidify. The cast, when applied, covers the tubular guide. When the time comes to remove the cast a scissors tool is utilized to cut through the cast. The tubular guide helps to direct the scissors.

Third Trend

A third trend in connection with the removal of a cast comprises utilizing a shield comprising an elongate relatively flat strip of material. The shield is placed on a portion of the body of an individual prior to applying the cast and permitting the cast to solidify. The cast, when applied, covers the flat strip of material. When the time comes to remove the cast with a cutting tool, the flat strip of material functions to shield the individual from a cutting tool.

Fourth Trend

A fourth trend in connection with the removal of a cast comprises utilizing a tool with a rigid foot that a user slides along a shield strip or guide channel. The tool also includes a rotary cutting tool that is situated above the fixed foot and cuts the cast. The tool utilizes a circular, flat, thin blade with teeth situated around the circular peripheral edge of the blade Fifth Trend A fifth trend in connection with the removal of a cast comprises utilizing a Stryker saw or similar tool to remove a cast. A Stryker saw includes a housing and a saw blade rotatably mounted on the housing. The saw blade is a panel-shaped, relatively thin, flat, circular blade with cutting or abrading material formed on the sides of the blade near the circular outer peripheral edge of the blade. The outer peripheral edge of the blade does not include abrading or cutting material; this to minimize the likelihood that the outer edge of the blade will cut the skin of an individual. The rapid rotation of the blade can, however, cause the outer peripheral edge to burn or cut the skin of an individual on contact. A user grasps the housing and uses the saw blade to cut through a cast while endeavoring not to contact and injure the skin of the individual. The Stryker saw can be, but often is not, utilized in connection with a protective strip or with a guide. The user simply does his or her best to guide and control the saw and to not inadvertently burn or cut the skin of an individual. Such inadvertent injury does, however, occur on a fairly regular basis. Further, the noise associated with use of the saw often effectively functions to terrify children who are having a cast removed. Such fear on the part of a child and the child's parent is magnified when a user inadvertently contacts and burns or cuts the skin of the child with the saw blade.

The Stryker saw is currently by far the presently preferred, and usually the only, method of removing a cast. The methods and tools set forth above with respect to the third trend are currently sometimes used on a limited basis in the market. However, the methods and tools set forth above in the first through the fourth trends otherwise are basically largely, if not entirely, obsolete, are currently ignored, and in the real world exist only in the print and paper comprising earlier issued patents, magazine articles, and other documents.

The Stryker saw has evidently been the preferred method of removing a cast for at least the last twenty (20) years; any perceived motivation to provide an alternate method or removing a cast has not provided sufficient impetus to displace use of the Stryker saw, or to reinstate the obsolete methodology set forth in prior issued patents or other documents.

Nonetheless, it is a principal object of the invention is to develop an improved method and apparatus to remove a cast, in particular a fiberglass cast, from an individual. A fiberglass cast is significantly more difficult to cut than was the old fashioned plaster cast.

BRIEF DESCRIPTION OF THE SEVERAL VIEWS OF THE DRAWINGS

This and other, further and more specific objects and advantages of the invention will be apparent to those skilled in the art from the following detailed description thereof, taken in conjunction with the drawings, in which:

FIG. 2 is a front view further illustrating the mode of operation of one of the embodiments of the invention;

FIG. 3 is a side elevation view illustrating the mode of operation of a track utilized in the practice of the invention;

FIG. 9 is a top view illustrating a guide tool utilized in conjunction with the tape of FIG. 5;

FIG. 10 is a side view further illustrating the guide tool of FIG. 9;

FIG. 11 is a front view of the tool of FIG. 10 illustrating further construction details thereof;

FIG. 12 is a back view of the tool of FIG. 10 illustrating further construction details thereof;

BRIEF SUMMARY OF THE INVENTION

Figure 1:
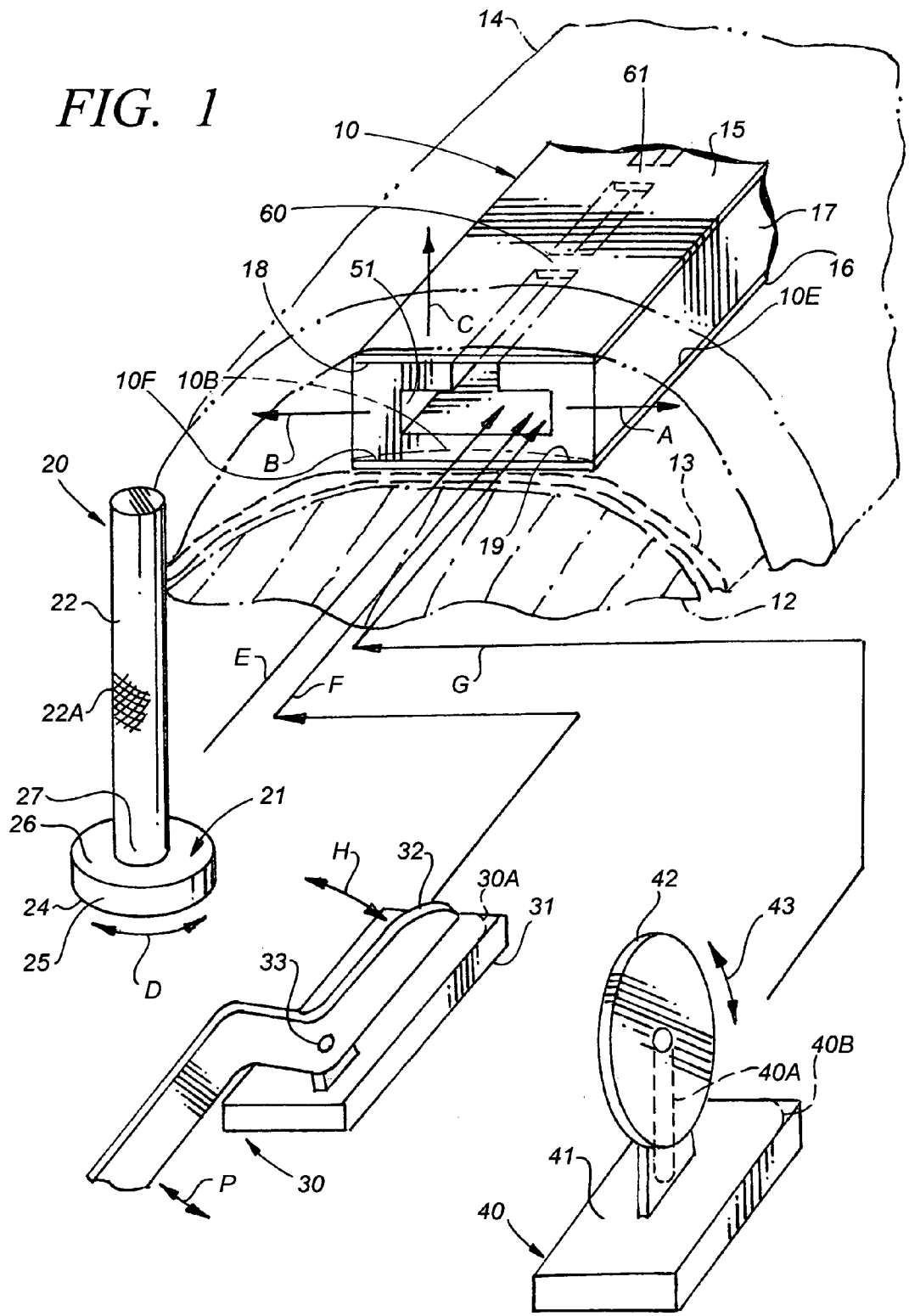
FIG. 1 is an exploded perspective view illustrating apparatus constructed in accordance with the principles of the invention and the mode of operation thereof.

Briefly, in accordance with the invention we provide an improved method of installing a fiberglass cast on and removing the cast from an individual. The method comprises the step of providing a track (10) with a top; a bottom; a length (L); an elongate primary guide opening (11) extending the length of the track, the opening having a width (W) and a selected shape and dimension; and, an elongate secondary guide opening (18) extending from the primary opening upwardly to the top of the track, and having a width less than the primary opening. The method also comprises the step of providing a rotatable bit (20) including a rotatable shaft (22) and a tracking foot (21). The shaft has an outer surface shaped and dimensioned to cut through a fiberglass cast; a width less than the width of the secondary guide opening; a distal end (27); and, is shaped and dimensioned to move along the secondary opening. The tracking foot is foot (21) is attached to the distal end of the shaft; has an outer surface (25); has a width greater than the width of the shaft (22) and less than the width of the primary opening, is free of cutting surfaces, and is shaped and dimensioned to generally conform to the shape and dimension of the primary guide opening to minimize lateral movement of the foot in the primary guide opening and to permit the foot to move freely along the primary opening. The method also includes the steps of placing the track (10) on an individual; applying at a first selected time a fiberglass cast on the individual, the cast covering substantially all of the track (10); and, at a second selected time subsequent to said first time, rotating the bit and moving the foot along the primary opening and the shaft along said secondary opening such that the shaft cuts through the fiberglass cast.

In another embodiment of the invention, provided is a method of installing a fiberglass cast on and cutting the cast for removal from an individual. The method includes the steps of providing a length of a pliable hollow thin-walled guide tube (110) with a top, a bottom, a length, and open first and second ends;

providing an elongate support tool (55) shaped and dimensioned to slide into and extend along the tube (110); and, providing a cutting tool (130). The cutting tool includes a housing (132); a motor unit mounted in the housing; a rotatable shaft (133) with a proximate end mounted on the motor unit, and with a distal end having an outer cutting surface shaped and dimensioned to cut through a fiberglass cast, the shaft being rotated by the motor; and, a guide tool (140) mounted on the housing and including a tracking foot (136) positioned beneath the cutting surface and shaped and dimensioned to fit in and slide along the pliable guide tube. The method also includes the steps of sliding said support tool in said pliable guide tube; placing the guide tube and support tube on an individual; applying at least first layer of fiberglass along and over a portion of the guide tube excluding the first end of the guide tube; wrapping the first end of said guide tube over said first layer of fiberglass to form a loop extending around said first layer of fiberglass; applying at least a second layer of fiberglass along and over the portion of the guide tube and the first end of the guide tube to affix the first end of the guide tube between the first and second layers of fiberglass; sliding the support tool out of the guide tube; and, allowing the first and second layers of fiberglass to harden; and, at a subsequent time, cutting the loop, and manipulating the tool to insert the guide foot in the guide tube and slide the guide foot along the tube while cutting through the fiberglass layers with the outer cutting surface.

DETAIL DESCRIPTION OF THE INVENTION

Turning now to the drawings, which depict the presently preferred embodiments of the invention for the purpose of illustrating the practice thereof and not by way of limitation of the scope of the invention and in which like reference characters refer to corresponding elements throughout the several views, FIG. 1 illustrates a track generally indicated by reference character 10. Track 10 preferably is, as will be described, somewhat pliable and is not rigid. Such pliability permits the track 10 to conform to the body of an individual. Track 10 includes top 18, bottom 19, and side 17. Primary opening 11 extends along the length (L) (FIG. 3) of track 10. Primary opening 11 includes and is circumscribed by vertically oriented sides 51 and 52, horizontally oriented bottom 50, and ceiling 53. As can be seen, primary opening 11 currently preferably has a rectangular cross section. The shape and dimension of opening 11 can, however, vary as desired and have, by way of example, a triangular, trapezoidal, or spherical cross section. If desired, the bottom of track 10 can, instead of being flat, be provided with a concave contour 10B (FIGS. 1 and 3) to enable track 10 to better contour to an arm or other portion of an individual's body. Similarly, if desired, the lower parallel outer edges 10E and 10F of track 10 can, instead of comprising straight edges, be rounded or provided with a radius as indicated by dashed line 10C and 10D in FIG. 2. The use of rounded edges 10C and 10D reduces the likelihood that edges 10E and 10F will generate uncomfortable pressure points in the tissue of an individual.

Secondary opening 18A also extends along the length (L) of track 10, and, extends upwardly from opening 11 to the top 18 of track 10. The width of opening 18A is less than the width W of the primary opening 11 and is greater than the width S of shaft 22 of bit 20 (FIG. 1).

As is illustrated in FIGS. 1 and 2, an adhesive strip 16 can, if desired, be applied to track 10 and extend along the bottom 19 of track 10. Strip 16 can, if desired, be covered with a protective strip of paper or other material. The protective strip is peeled off strip 16 prior to emplacing strip 10 on an individual when a cast is being applied to the individual.

A protective strip of material 15 (FIG. 1) can, if desired, be applied to the top 18 of track 10 to cover secondary opening 18. Strip 15 is preferred because it prevents fiberglass or other material from entering openings 18A and 11 when a cast is being formed over track 10. The strip 15 is preferably formed of a thin sheet of paper, polymer, or some other material that can readily be cut by bit 20 when foot 21 moves along the length of opening 11. In an alternate embodiment of the invention, ribs or bridge structures 60, 61 extend across strip 15 at selected spaced apart locations along the length of opening 18. Ribs 60, 61 can be utilized in place of or in conjunction with strip 15.

Track 10 preferably is somewhat pliable along its length such that track 10 will bend downwardly longitudinally in the manner indicated by dashed lines 10A about an axis X (of upwardly about on axis X1) that in FIG. 3 is perpendicular to the plane of the sheet of paper of the drawing. This permit track 10 to conform to the body of an individual. On the other hand, it is preferred to limit the ability of track 10 to bend transversely about an axis Y that in FIG. 3 is perpendicular to the plane of the sheet of paper of the drawing. In other word, track 10 is transversely substantially rigid. Transverse rigidity is important because it significantly reduces the likelihood that track 10 will transversely bend and then bind foot 21 as it moves along track 10.

Bit 20 includes cutting shaft 22 and foot 21 fixedly attached to the distal end 27 of shaft 22. The outer surface 22A of shaft 22 is serrated or otherwise shaped and dimensioned and configure to cut through strip 15 and ribs 60 and 61 when bit 20 rotates about the longitudinal axis of bit 20. Proximate, or upper, end of shaft 22 is engaged by a drill chuck (not shown) or other apparatus that rotates bit 20. Foot 21 includes upper surface 26, bottom surface 24, and peripheral cylindrically shaped outer surface 25. Bottom surface 24 can, as indicated by dashed line 24A in FIG. 2, have a convex shape to facilitate movement of foot 21 along primary opening 11. Foot 21 is shaped and dimensioned generally to fit in, conform to, and move along primary opening 11. In this manner, when foot 21 is slid or otherwise moved along the length of opening 11, opening 11 restricts lateral movement of foot 21 in the directions of arrows A and B and restricts vertical movement of foot 21 upwardly in the direction of arrow C (FIG. 1). Primary opening in essence functions to "capture" foot while permitting foot 21 to be freely moved along the length of opening 11 while bit 20 is rotating. The rounded cylindrical outer surface 25 of bit 20 provides a minimal contact area in the event foot 21 bears against a side 51, 52. Bottom surface 24 readily rotates over bottom 50 of opening 11. Bottom surface 24 of foot 21 preferably, but not necessarily, has a convex shape to minimize the area of surface 24 that is contact with bottom 50 at any given time.

Rectangular foot 40 (FIG. 1) is, in a manner similar to foot 21, shaped and dimensioned to fit in and freely slide along opening 11. A saw blade 42 is mounted on the top 41 of foot 40 to rotate in a selected one of the directions indicated by arrows 43. A motor or other motive power (not shown) is provided to turn blade 42 such that it cuts through a fiberglass cast while foot 40 travels along the length of opening 11.

Rectangular foot 30 (FIG. 1) is, in a manner similar to feet 21 and 40, shaped and dimensioned to fit in and freely slide along opening 11. A scissor jaw 32 is pivotally 33 mounted on foot 30 and pivotally reciprocated in the manner indicated by arrows H to cut through a fiberglass cast while foot 30 travel along the length of opening 11.

In use, a strip of soft cast padding/stockingette material is wrapped 13 (FIG. 1) around an arm, leg, or other body area on which a cast is to be mounted. The protective paper or polymer strip (not shown) cover adhesive layer 16 is removed, and track 10 is placed on the arm generally parallel to the longitudinal axis of the arm. Adhesive layer 16 secures track 10 to the layer of cotton lining material, (or to a layer(s) of another material or to the skin if such a layer is not utilized. A fiberglass cast 14 is then applied around the arm and is allowed to harden. The fiberglass cast 14 covers substantially the entire length of track 10 except, however, the ends of track 10 are left exposed, or accessible, to facilitate the use of bit 20. At some subsequent time, the cast needs to be removed. At that time, bit 20 is rotated, and foot 21 is moved into one end of primary opening 11 in the manner illustrated in FIG. 2 and is moved along the entire length of opening 11 to cut the fiberglass cast. When foot 21 moves into opening 11, shaft 22 extends upwardly through secondary opening 18A and simultaneously cuts through strip 15 and the portion of cast 14 positioned directly above secondary opening 18A. A portion of rotating shaft 22 moves along secondary opening 18A (FIG. 2) simultaneously with the movement of foot 21 along primary opening 11.

Figure 4:
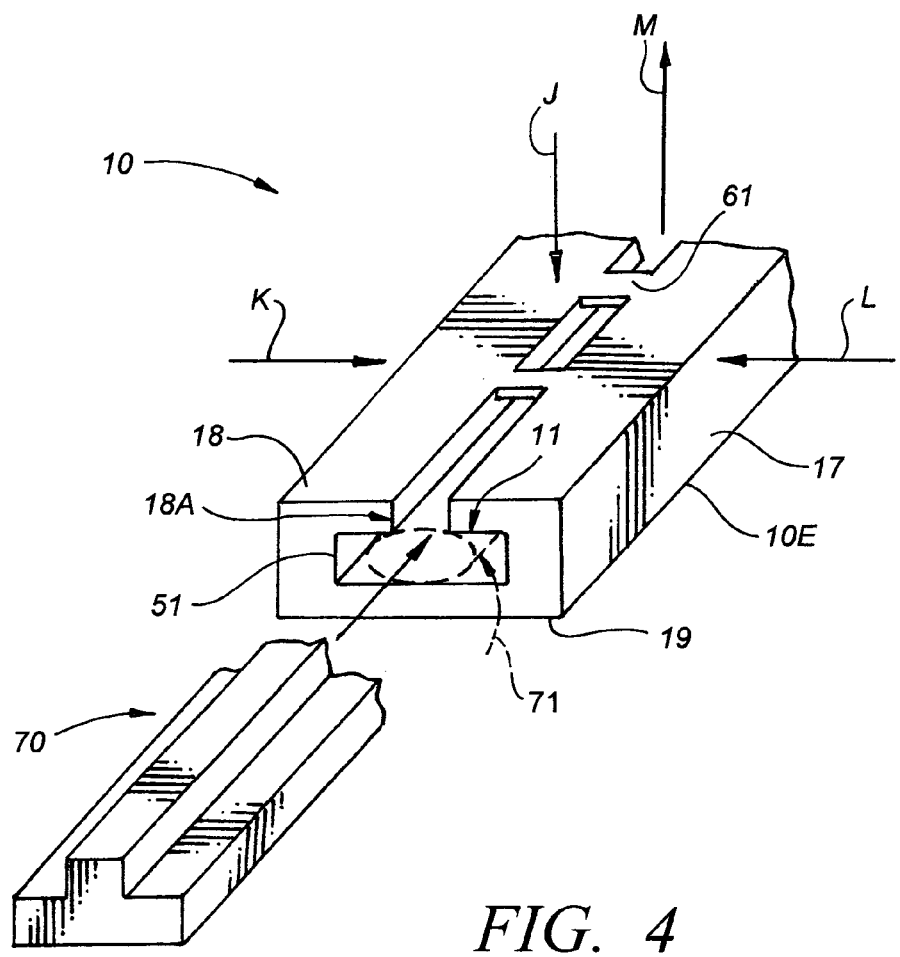
FIG. 4 is an exploded perspective view illustrating apparatus constructed in accordance with the principles of the invention and illustrating a removable insert utilized to strengthen the apparatus during the application of a cast to an individual.

In one preferred embodiment of the invention, when bit 20 is rotated and foot 21 is moved along opening 11 to cut through cast 14, bit 20 is pulled upwardly in the direction of arrow M (FIG. 4). The magnitude of the force generated in the direction of arrow M can vary as desired, but ordinarily is relatively small and, in contrast to a Stryker saw, is sufficient to insure that track 10 is not downwardly pressed against the body of the individual while bit 20 cuts through cast 14. If the magnitude of force M is too great, the friction forces generated when rotating foot 21 bears against ceiling 53 can unnecessarily impede the ready movement of foot 21 along opening 11.

FIG. 1 illustrates only a single track 10 on the arm of an individual. As would be appreciated by those of skill in the art, cast 14 ordinarily needs to cut along two opposing sides to be removed. Accordingly, a second track (not visible in FIG. 1) is placed on layer 13 on the opposite side of the arm at the same time track 10 is placed on layer 13. When cast 14 is applied, it covers both tracks. In other words, the procedure for installing the second track is equivalent to that for installing track 10. When the time comes to remove a fiberglass cast 14, rotating bit 20 is moved along track 10 to make one cut through cast 14, and is then moved along the second track to make a second cut through cast 14. The two cuts function to halve the cast to permit ready removal of the cast from the individual's arm.

A length of track 10 can be wound and stored on a roll such that a desired length of track 10 can be pulled off the roll and cut from the roll, much like rope is stored on a large roll and desired lengths of rope are measured and cut from the rope remaining on the roll.

In some instances, a cast 14 made from fiberglass or an equivalent material is applied to portions of an individual's body that are at an angle to one another. For example, in some cases it is desirable to maintain the lower arm generally perpendicular to the upper arm. In this instance, two lengths 10, 10A (FIG. 3) of track can be utilized. One length is along the lower arm. The other length is along the upper arm. In FIG. 3, adjacent ends of tracks 10, 10A generally co-terminate. If desired, however, one adjacent end can extend past the other adjacent end. If after bit 20 is utilized, a portion of a cast remains uncut, then the scissors-like cutting apparatus 30, 32 of FIG. 1 (or another other desired apparatus) can be utilized to finished cutting the cast.

In FIG. 1, foot 31 of tool 30 is shaped and dimensioned generally to fit in, conform to, and move along primary opening 11. In this manner, when foot 31 is slid or otherwise moved along the length of opening 11, opening 11 restricts lateral movement of foot 31 in the directions of arrows A and B and restricts vertical movement of foot 31 upwardly in the direction of arrow C (FIG. 1). Primary opening 11 and foot 31 function in combination to "capture" and restrict the movement of foot 31 while permitting foot 31 to be freely moved along the length of opening 11 while scissors jaw 32 is manipulated about pivot pin 33 in the directions indicated by arrows P in order to cut a cast. If desired, a lower jaw can be provided which also pivots about pin 33 and opposes jaw 32 in the manner that a pair of conventional scissors have a pair of opposing jaws pivoting about a common point.

In FIG. 1, foot 41 of tool 40 is shaped and dimensioned generally to fit in, conform to, and move along primary opening 11. In this manner, when foot 41 is slid or otherwise moved along the length of opening 11, opening 11 restricts lateral movement of foot 41 in the directions of arrows A and B and restricts vertical movement of foot 41 upwardly in the direction of arrow C (FIG. 1). Primary opening 11 and foot 14 function in combination to "capture" foot 41 while permitting foot 41 to be freely moved along the length of opening 11 while saw blade 42 rotates in one of the directions indicated by arrows 43. A slot 40A can be formed in tool 40 so that blade 42 can travel up and down in slot 40A while the blade 42 is cutting the a fiberglass cast 14.

In FIG. 4, insert 70 is shaped and dimensioned to generally conform to and to be slidably inserted simultaneously into primary opening 11 and secondary opening 18A. When track 10 is placed on a part of an individual's body and a fiberglass cast 14 is wrapped around track 10, forces acting in the direction of arrows J, K, and L are generated, act against, and tend to deform track 10. Insert 70 functions to maintain the shape and dimension of track 10 and, in particular, of openings 11 and 18A. Maintaining the shape of openings 11 and 18A is important because foot 21 and shaft 22 must freely move along openings 11 and 18A, respectively, when bit 20 is utilized to cut through and remove cast 14. An insert that provides support for track 10 need not have the "inverted T" shape of insert 70 or conform closely to the shape and dimension of openings 11 and 18A. An insert 71 with an oval or circular or other cross-sectional area can function, when inserted in track 10, to provide support and prevent or minimize the deformation of track 10 when forces J, K, or L are applied to track 10. As is illustrated in FIG. 3, track 10 can, if desired, be somewhat pliable along its length such that track 10 will bend downwardly (or upwardly) longitudinally. An insert 70, 71 can similarly be somewhat pliable and bend downwardly (or upwardly) along its longitudinal axis such that track 10 and an insert 70, 71 can—when insert 70, 71 is slidably inserted in openings 11 and/or 18A and extends along (either partially or completely) the length of track 10—bend simultaneously along their longitudinal axes.

An alternate embodiment of the invention is illustrated in FIGS. 5 to 17.

Figures 5, 6:
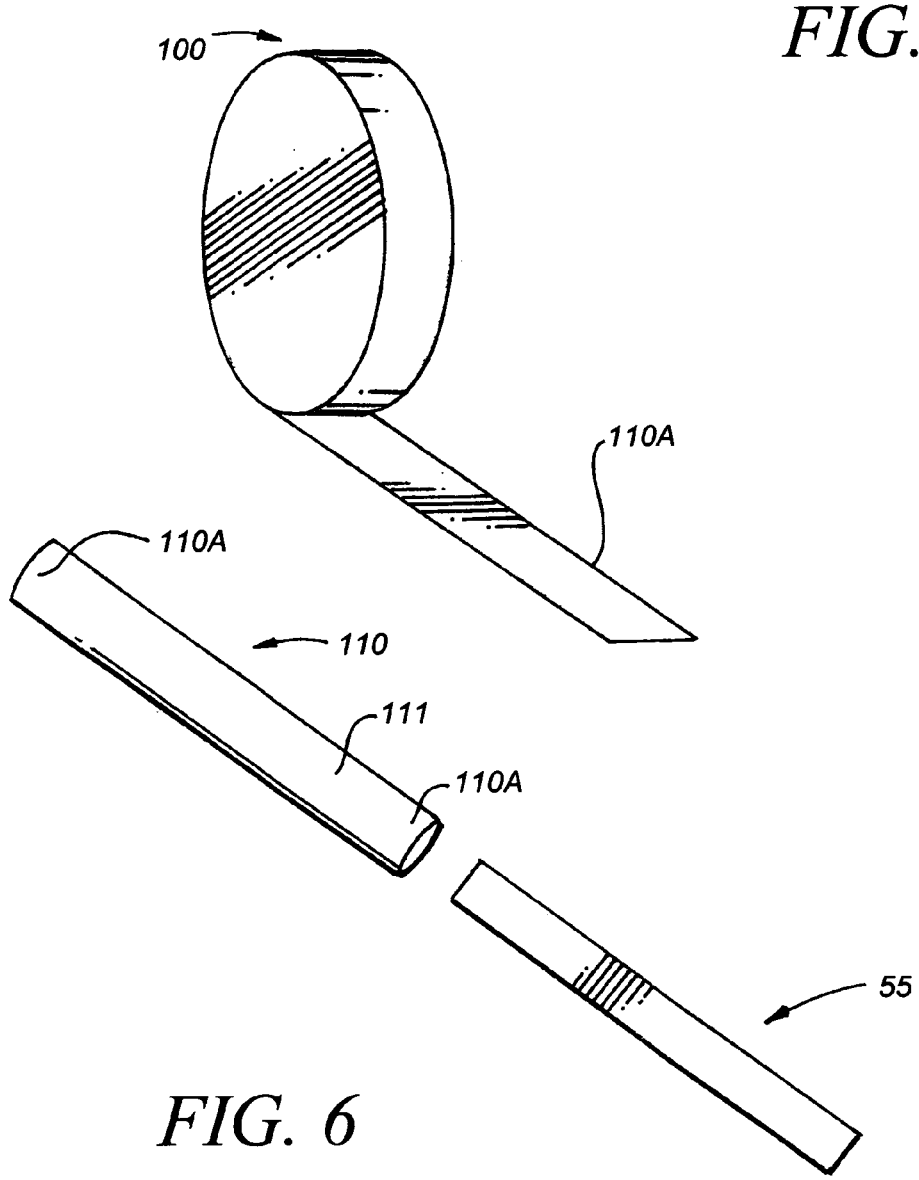
FIG. 5 is a perspective view illustrating a roll of pliable hollow tape utilized in an alternate embodiment of the invention.
FIG. 6 is a perspective view illustrating the mode of operation of the tape of FIG. 5 in conjunction with a support tool in accordance with the alternate embodiment of the invention.

FIG. 5 illustrates a roll 100 of pliable hollow thin-walled guide tubing having a free open end 110A.

As illustrated in FIG. 6, a strip 110 of pliable tubing is cut from roll 100. Strip 110 comprises hollow sleeve 111. Tubing sleeve 111 can, but preferably is not, be elastic. Sleeve 111 includes a pair of free open ends 110A. Consequently, although sleeve 111 is formed from a pliable polymer or other pliable material, sleeve 111 ordinarily will not stretch like a rubber band, or if sleeve 111 does stretch, it will do so only minimally. FIG. 6 also illustrates a support tool 55 comprised of a strip or rod fabricated from plastic or metal or other material.

Tool 55 is slidably inserted in pliable sleeve 111 to support and generally maintain the elongate configuration of tubing sleeve 111 while sleeve 111 is mounted on padding 121 that extends around the arm or other body portion of an individual. Tool 55 ordinarily is substantially rigid, but is still somewhat pliable, much like a flat, thin, orthogonal ruler made from a thin strip of stainless steel. The pliability of tool 55 permits it to conform to a certain extent to a person's body while still providing support for sleeve 111.

Figure 7:
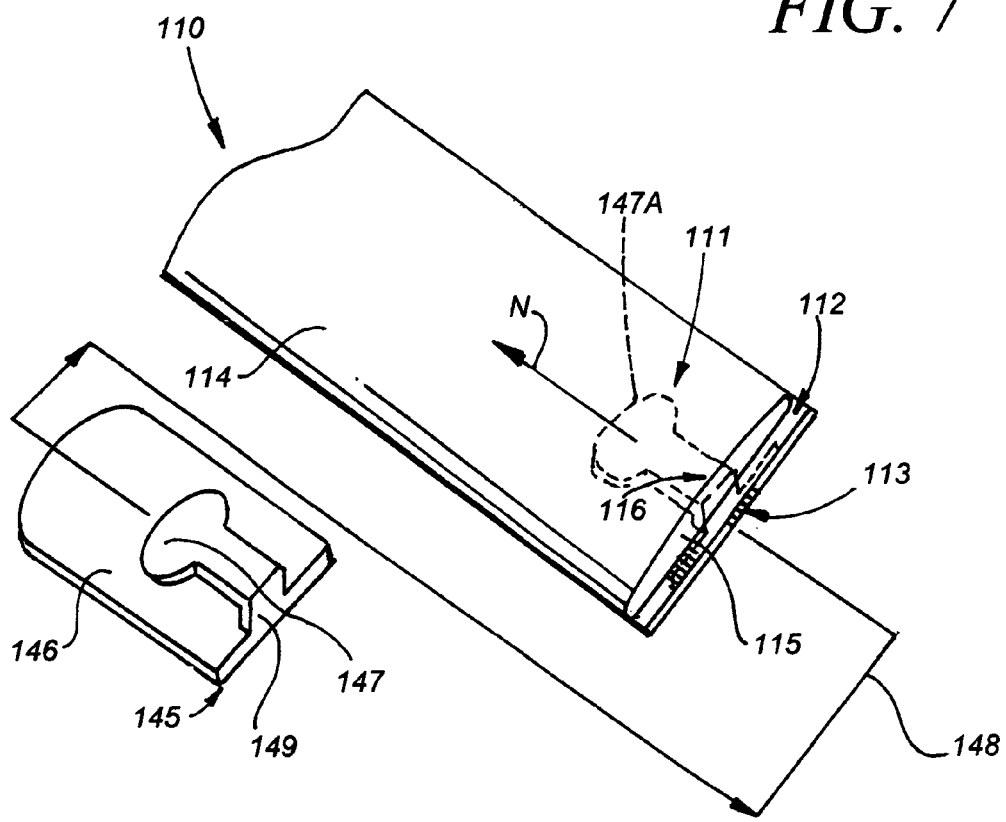
FIG. 7 is an enlarged perspective view further illustrating a section of the tape of FIG. 5.

The strip 110 is further depicted in FIG. 7 and illustrates the top 114 and bottom 115 of hollow elongate polymer sleeve 111. Foam strip 112 is glued or otherwise adhered to the exterior of bottom 115. A layer 113 of contact adhesive is formed on the bottom of foam strip 112 and is covered by a protective peelable removable strip (not shown) of wax paper or other material. This peelable strip is removed from adhesive layer 113 prior to applying sleeve 111 to the padding 121 on the arm (or leg or other body portion) 120 of a patient.

Figure 8:
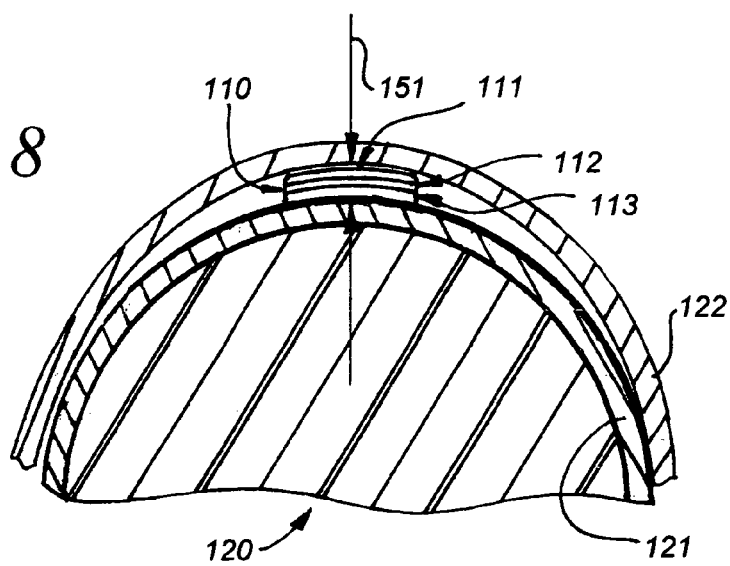
FIG. 8 is a perspective view further illustrating the mode of operation of the tape of FIG. 5.
Figure 17:
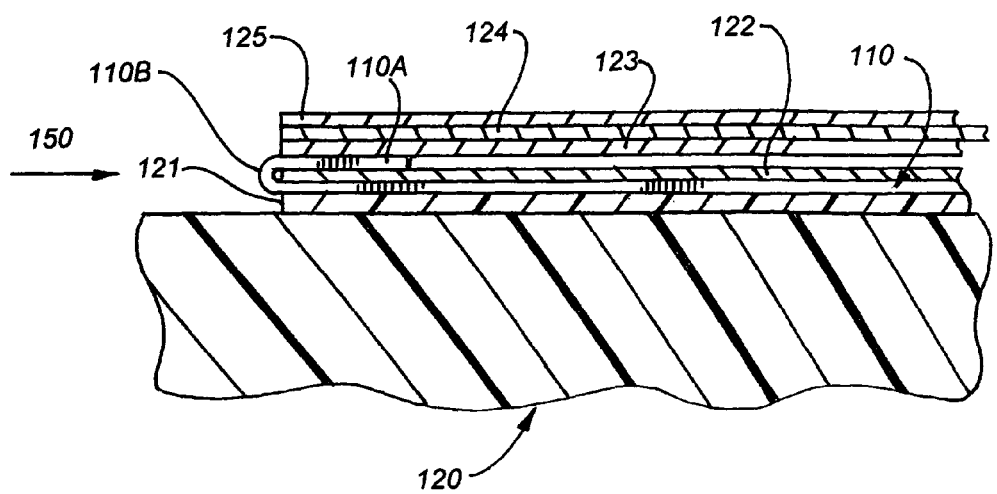
FIG. 17 is a side section view illustrating the mode of operation of the tape of FIG. 5.

FIGS. 8 and 17 illustrate the mounting of pliable substantially non-elastic strip 110 during the application of a cast to the arm 120 of an individual. After a physician has, if necessary, appropriately aligned and "set" a broken bone, padding 121 is wrapped around arm 120. Antiseptic can, if desired, be applied to the surface of arm 120 prior to applying padding 121. A sleeve 111 of appropriate length is cut. The length of sleeve 111 is, as will be apparent below, greater than the length of the cast that is to be applied. Tool 55 is slidably inserted in sleeve 111. Tool 55 preferably, but not necessarily, extends along the entire length of sleeve 111.

The protective peelable backing covering the layer 113 of contact adhesive is removed, and sleeve 111 is mounted on padding 121 such that contact adhesive layer 113 adheres to padding 121. The use of force to, press sleeve 111 against padding 121 is minimized to minimize discomfort to the patient. Each of the free ends 110A of sleeve 111 extends outwardly beyond the ends of padding 121. Once sleeve 110 is in place on padding 121, tool 55 can, if desired, be slidably removed from sleeve 111.

The first layer 122 of fiberglass is wrapped around and over padding 121 and sleeve 111. Tool 55 must then, if not already removed from sleeve 111, be slidably removed from sleeve 111. The free ends 110A of sleeve 111 are wrapped up and over the first layer 122 of fiberglass and a second layer 123 of fiberglass is wrapped over and around the first layer 122 of fiberglass. The second layer 123 extends over free ends 110A and fixes them in place in the manner illustrated in FIG. 17. As a result, an elbow 110B or bend is formed at each end of sleeve 111. When the time comes to remove the cast, elbow 110B is cut to form an open end in sleeve 111 so that the foot 136 (FIG. 9) of the cutting tool can be inserted in the open end of and slide along sleeve 111. Additional layers 124 and 125 of fiberglass are applied and extend over and around fiberglass layer 123. The fiberglass layers 122 to 125 are permitted to harden to complete the application of the cast.

In an alternate embodiment of the invention, padding 121 extends a distance along arm 120 that is generally equivalent to the length of sleeve 111; however, the fiberglass layers extend a distance along arm 120 that is less than the distance which padding 121 (and sleeve 111) extends. Since the distance along arm 120 that the fiberglass extends is less than the distance along the arm 120 that sleeve 111 extends, this still permits the free ends 110A of sleeve 111 to be wrapped up and over fiberglass layer 122 in the manner illustrated in FIG. 17.

In a further embodiment of the invention, the free ends of sleeve 111 are not wrapped up and over the first layer of fiberglass in the manner describe above. Instead, after fiberglass layer 122 is applied, the free ends are cut off so that the ends of sleeve 111 generally co-terminate with the ends of the layer 122. Each end of sleeve 111 is sealed using the closure 145 illustrated in FIG. 7. The tombstone-shaped foot 146 of each closure 145 is inserted in an end of sleeve 111 in the manner indicated by arrow 148 in FIG. 1. Clip 147 extends upwardly and then over the top of layer 122 in the manner suggested in FIG. 7. Layer 122 is not depicted in FIG. 7, but clip 147 would, however, extend over the top of layer in the same manner it extends over the top 114 of sleeve 111 in FIG. 7. The subsequent layer of fiberglass 123 extends over and secures clip 147 (and insert 145) in place. When the time arrives to remove the cast, arm 149 is cut and foot 146 is pulled out from the end of sleeve 111 so that foot tracking foot 136 can be inserted in sleeve 111 in the manner described below.

Once the fiberglass cast has been worn a time sufficient for the bone to heal, or in the event there is another reason to remove the cast, the cast is removed.

First, scissors or another cutting tool is used to cut through the loop 110B at each end of the cast. This produces an opening at each end of the portion of sleeve 111 that extends intermediate padding 121 and fiberglass layer 122.

Second, tool 130 of FIGS. 9 to 16 is utilized to cut through the cast.

Figure 15:
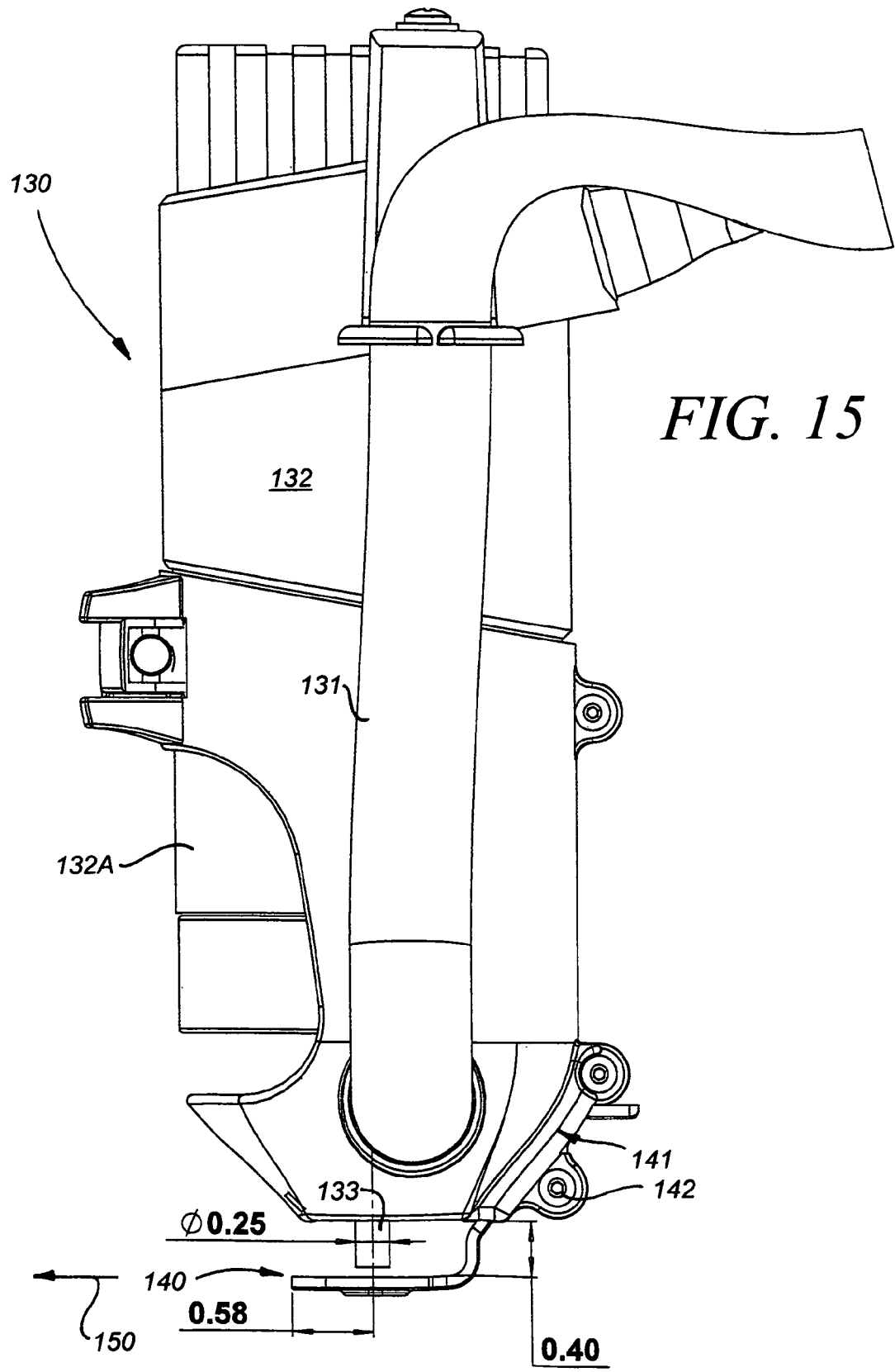
FIG. 15 is a side view further illustrating the tool of FIG. 13.

Tool 130 includes a housing 132. A motor unit 132A is mounted in housing 132. A guide tool 140 is mounted on the lower portion of housing and includes a tracking foot 136. Foot 136 includes detent 137 and a toe, or leading edge, 135. Arm 137A extends upwardly from foot 136. Arm 137A is adjustably compressibly secured in a slot in housing 132 by tightening a member 141 against arm 137A with one or more bolts 142 (FIG. 15). The motor unit 132A includes a chuck (not visible) comparable to a conventional drill chuck that removably receives the upper proximate end of the shaft 133 of a cutting bit or tool. The motor unit 132A rotates shaft 133 in the direction indicated by arrow R. The lower end of shaft 133 is positioned adjacent detent 137 of foot 136. The lower end of shaft 133 includes an outer cutting or abrading surface. The shape and dimension and makeup of the cutting surface can vary as desired; however, the cutting surface is presently cylindrically shaped and can include embedded carbide or diamond particles that can effectively cut through the hardened fiberglass comprising a cast.

A vacuum unit (not shown) can be attached to the distal end of a suction hose 131. The proximate end of hose 131 is, as illustrated in FIG. 13, adjacent the cutting surface at the lower end of shaft 133 to draw cut fiberglass particles up through hose 131 in the direction of arrow D and to a collection bin (not shown).

Motive power to operate motor 132A can be supplied by a battery mounted in housing 132, by an electrical cable 132B, etc.

Figure 13:
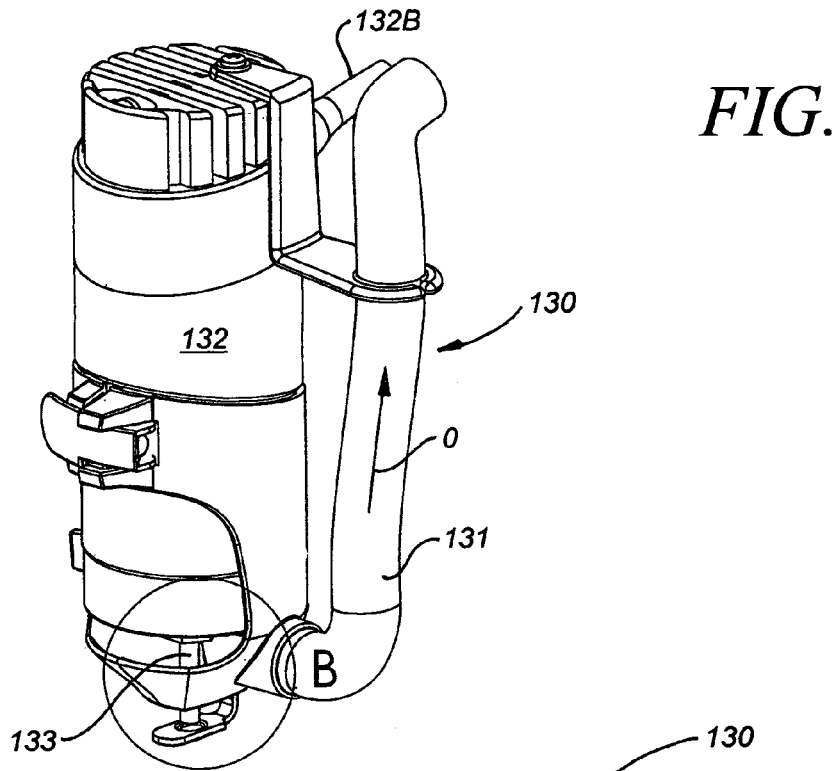
FIG. 13 is a perspective view illustrating a motive power tool utilized in conjunction with the tape of FIG. 5.
Figure 14:
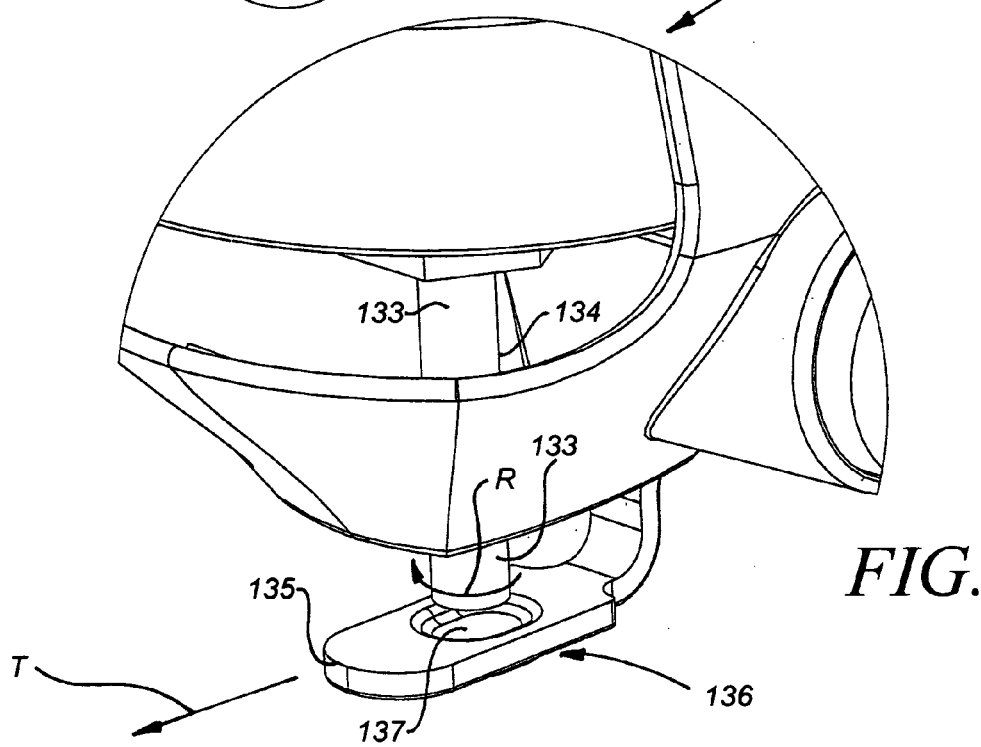
FIG. 14 is an enlarged perspective view of a portion of the power tool of FIG. 13 further illustrating construction details thereof.
Figure 16:
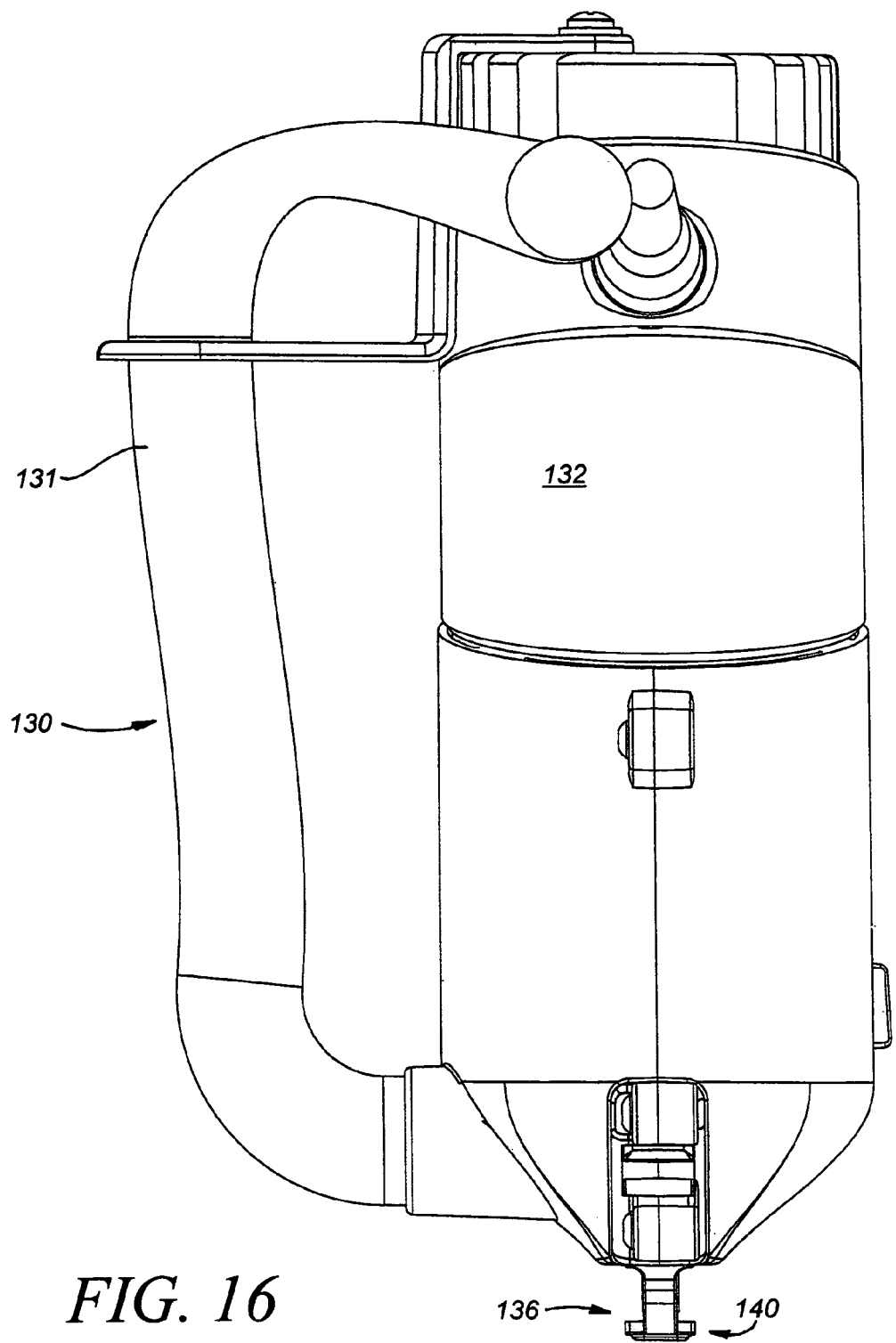
FIG. 16 is a back view further illustrating the tool of FIG. 13.

After loop 110B is cut, tool 130 is manually grasped in the upright orientation pictured in FIGS. 13, 15, 16; toe 136 is initially inserted in one of the open ends of sleeve 111 that extends between fiberglass layer 122 and padding 121; motor 132A is activated to rotate shaft 133; and tool 130 is displaced in the direction of arrow 150 (FIG. 17). As tool 130 is moved in the direction of arrow 150, toe 135 leads the way as foot 136 slides through hollow sleeve 111. While foot 136 slides through hollow sleeve 111, rotating shaft 133 cuts and forms a channel through the fiberglass cast and through the top 114 of sleeve 111. In addition, when foot 136 slides through sleeve 111, the individual (or machine) utilizing tool 130 lifts tool 130 slightly to produce a minimal upward force so that foot 136 contacts and pressed against the top 114 of sleeve 111 and is displaced in a direction away from and readily slides over (or above) the bottom 115 of sleeve 111. This minimizes the likelihood that foot 136 will bind sleeve 111 or will generate a downward pressure against or "dig into" the arm 120 of the patient. The minimal upward force generated by lifting tool 130 is not great because it is important that foot 136 not bind with the top 114 of sleeve 111. The upward force is simply sufficient to minimize or reduce the pressure of foot 136 against bottom 115 and to minimize the frictional forces generated by foot 136 sliding over bottom 115.

As would be appreciated by those of skill in the art, FIG. 17 illustrates the insertion of a first sleeve 111 on one side of arm 120. Ordinarily another second sleeve 111 is similarly inserted on the opposite side of arm 120 (or of a leg or other part of the body) and is parallel to the first sleeve 111 so that when the time comes to remove the cast, the cast is cut apart along two opposing sides of the cast.

Sleeve 111 must, in accordance with the invention, have several important properties.

First, the sleeve 111 must be pliable and bend in the same manner that a strip of conventional flat Christmas ribbon is pliable and bends—this in order to permit the sleeve 111 to generally conform to a patient's body.

Second, the sleeve must not be elastic and readily deform. In this sense, sleeve 111 is again similar to a piece of conventional elongate flat Christmas ribbon because such ribbon normally is not—even though it readily bends around the corners of a Christmas package—elastic; the ribbon does not readily stretch longitudinally or transversely. If the sleeve 111 were elastic and readily deformed, it could allow foot 136 to wander off track when tool 130 is used to cut the cast.

Third, when the sleeve 111 is fabricated from a polymer, the polymer must have a strength sufficient to minimize the likelihood that foot 136 can puncture the sleeve. It is preferred that the polymer have a width of at least 2 mils, preferably 3 mils, and most preferably at least 4 mils.

Fourth, it is important that sleeve 111 not lose its physical properties when heat is generated in the cast while the fiberglass cures. Consequently, the sleeve must not soften, melt, or become elastic in the event the sleeve is heated up to a maximum temperature of 130 degrees F., more preferably in the event the sleeve is heated up to a maximum temperature of 140 degrees F., and most preferably in the event the sleeve is heated up to a maximum temperature of 150 degrees F. A fiberglass cast can generate heat while it cures and hardens. It is believed that the temperature in the cast can, depending on conditions, exceed fifty degrees centigrade while the cast cures.

Fifth, the sleeve 111 must permit foot 136 to slide along the sleeve when tool 130 is used to removed a cast. To this end, sleeve 111 can, if desired, be fabricated from a polymer, metal, or other material that includes an interior surface having a low coefficient of friction so that foot 136 readily slides along the interior of sleeve 111. A "sticky" polymer that would tend to adhere to foot 136 normally is not acceptable. Foot 136 preferably does not stick or adhere to the material comprising strip 111.

Sixth, the overall thickness, indicated by arrows 151 in FIG. 8, of sleeve 111 when top 114 is flat against bottom 115 is important. If the strip is too thick, the fiberglass layers can squeeze strip 110 and produce pressure which is uncomfortable to a patient; especially in the long term. The thickness 151 is no more than one-fourth of an inch, preferably no more than one-eighth of an inch, and more preferably no more than 3/32 of an inch, and most preferably no more than 1/16 of an inch. This thickness 151 includes sleeve 111, foam layer 112, and the adhesive layers. It does not include the protective removable backing strip that cover the adhesive layer 113.

Having set forth our invention in terms to enable those skilled in the art to understand and practice the invention and having set forth the presently preferred embodiments and uses thereof,

We claim:

1. A method of installing a fiberglass cast on and cutting the cast for removal from an individual, comprising the steps of:
    (a) providing a length of a pliable hollow thin-walled guide tube (110) with
        (i) a top,
        (ii) a bottom,
        (iii) a length, and (iv) open first and second ends;
(b) providing an elongate support tool (55) shaped and dimensioned to slide into and extend along said tube (110);
(c) providing a cutting tool (130) including
   (i) a housing (132),
   (ii) a motor unit mounted in said housing,
   (iii) a rotatable shaft (133) with
      a proximate end mounted on said motor unit, and
      a distal end having an outer cutting surface shaped and dimensioned to cut through a fiberglass cast,
      said shaft being rotated by said motor, and
   (iv) a guide tool (140) mounted on said housing and including
      a tracking foot (136) positioned beneath said cutting surface and shaped and dimensioned to fit in and slide along said pliable guide tube,
(c) sliding said support tool in said pliable guide tube;
(d) placing said guide tube and said support tool therein on an individual;
(e) applying at least first layer of fiberglass along and over a portion of said guide tube excluding said first end of said guide tube;
(f) wrapping said first end of said guide tube over said first layer of fiberglass to form a loop extending around said first layer of fiberglass;
(g) applying at least a second layer of fiberglass along and over said portion of said guide tube and said first end of said guide tube to affix said first end of said guide tube between said first and second layers of fiberglass;
(h) sliding said support tool out of said guide tube;
(i) allowing said first and second layers of fiberglass to harden; and
(j) at a subsequent time,
   (i) cutting said loop, and
   (ii) manipulating said guide tool to insert said guide foot in said guide tube and slide said guide foot along said guide tube while cutting through said fiberglass layers with said outer cutting surface.

* * * * *